May 2, 1933.  L. LEBEL  1,907,208
JACK
Filed Jan. 31, 1931   3 Sheets-Sheet 1
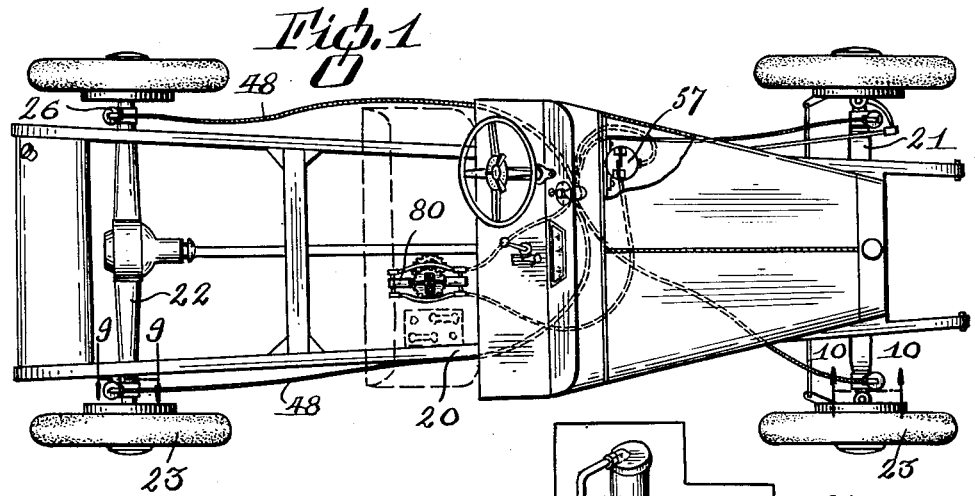
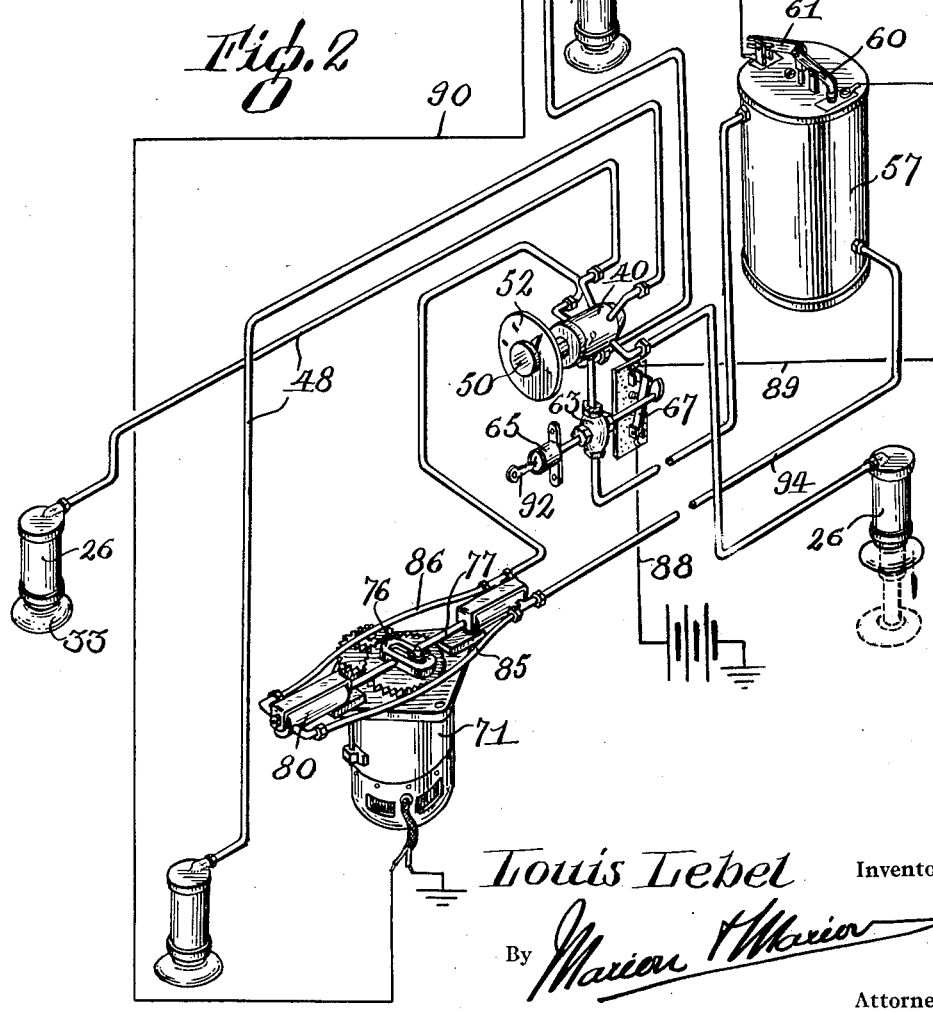
Louis Lebel, Inventor
By *Marion & Marion*
Attorneys

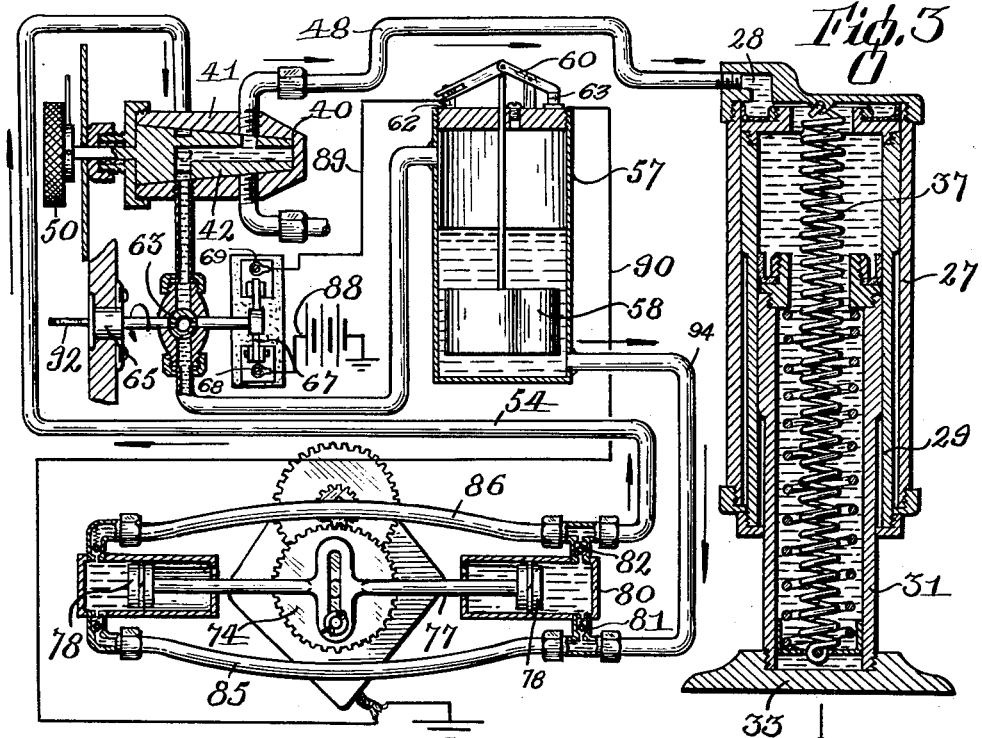
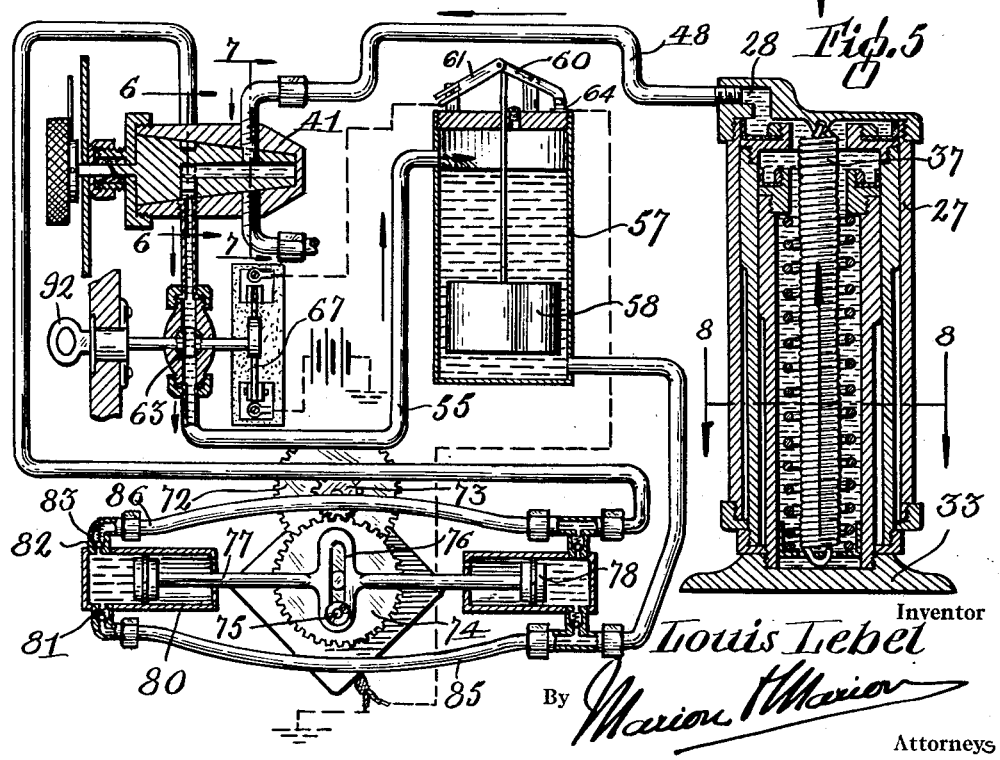

May 2, 1933.　　　　　L. LEBEL　　　　　1,907,208
JACK
Filed Jan. 31, 1931　　　3 Sheets-Sheet 3
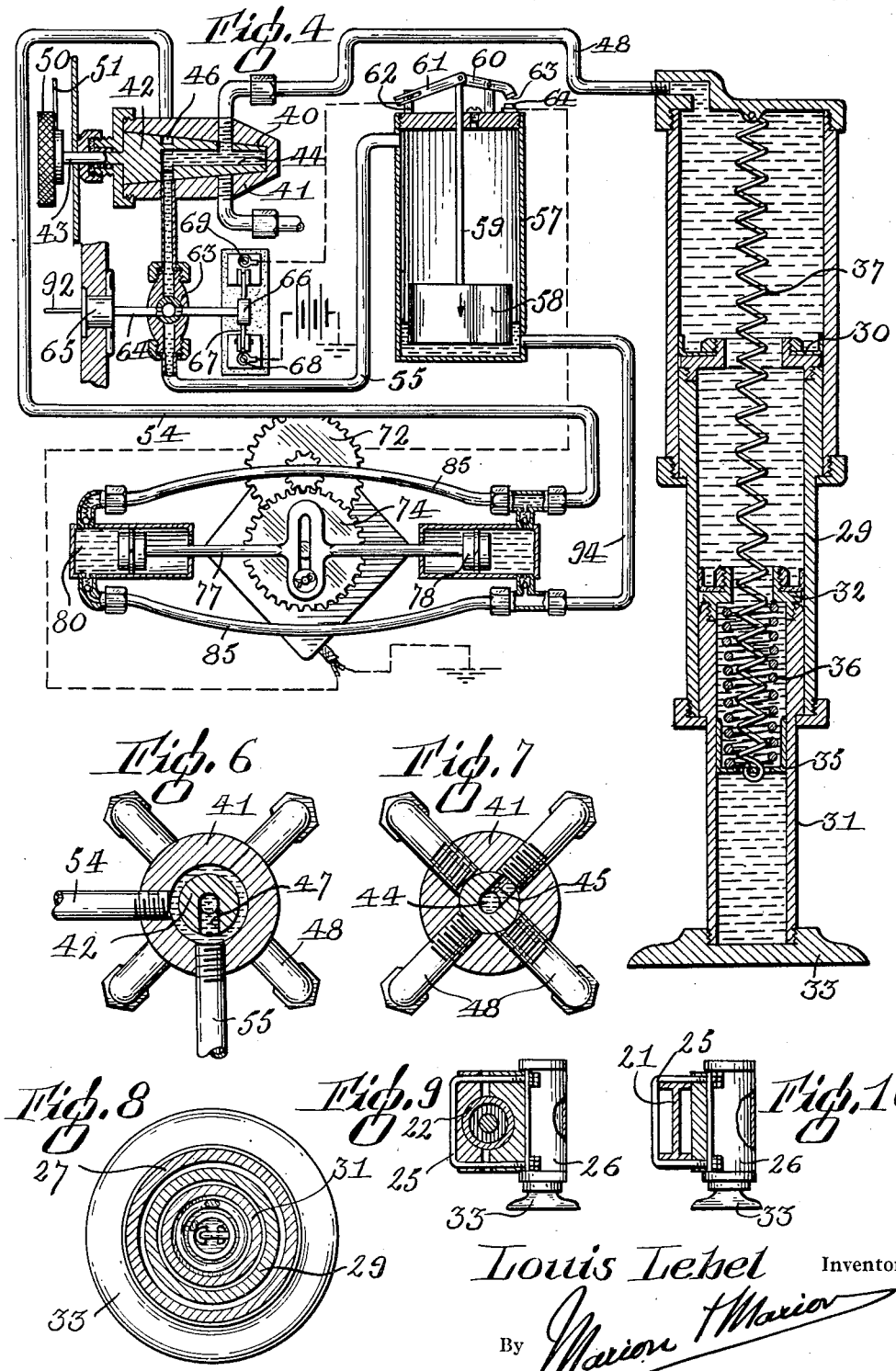

Patented May 2, 1933

1,907,208

UNITED STATES PATENT OFFICE

LOUIS LEBEL, OF WEEDON, QUEBEC, CANADA

JACK

Application filed January 31, 1931. Serial No. 512,725.

The present invention relates to a jacking system for automobiles and the like and has for its primary object to provide an improved jacking system which may be conveniently controlled by the vehicle operator when seated in the usual driving position.

A further object of the invention is the provision of a jacking system of the above character which may be locked to prevent unauthorized operation of the lifting jacks.

Another object of the invention is the provision of a jacking system of the above type embodying means for automatically disconnecting the pressure supply to a jack when the same has been extended to a lifting position.

Still another object of the invention is the provision of a fluid pressure operated jack designed to automatically contract to an inoperative position when the source of pressure is disconnected therefrom.

A still further object of the invention is the provision of a jacking system of the above type which will be relatively simple and durable in construction and reliable in operation.

Other objects and advantages of the invention will become apparent as the description progresses.

In the accompanying drawings forming a part of this specification and in which like reference characters are employed to designate corresponding parts throughout the same:

Figure 1 is a top plan view of an automobile chassis illustrating the improved jacking mechanism associated therewith, Figure 2 is a perspective view of the jacking mechanism detached from the chassis, Figure 3 is an elevational view of the apparatus, partly in section and illustrating the position thereof during the initial extension of the jack, Figure 4 is a similar view showing the position of the apparatus when a jack is fully extended, Figure 5 is a similar view showing the arrangement during the retractible movement of the jack, Figure 6 is an enlarged transverse sectional view taken on the line 6—6 of Figure 5, Figure 7 is a similar view taken on the line 7—7 of Figure 5, Figure 8 is a transverse section taken on the line 8—8 of Figure 5, Figure 9 is an enlarged transverse section taken on the line 9—9 of Figure 1, and Figure 10 is a similar view taken on the line 10—10 of Figure 1.

Referring to the drawings, wherein for the purpose of illustration is shown a preferred embodiment of the invention, the numeral 20 generally designates an automobile chassis of conventional construction provided with a front axle 21 and a rear axle housing 22. Mounted on the axles in the customary manner are the four carrier wheels 23.

Attached to front axle and the rear axle housing adjacent the wheels by means of U-shaped brackets 25 and in vertical positions, are a series of, in the present instance four, fluid pressure jacks, each indicated in its entirety by the numeral 26.

Each of the jacks 26 embodies a main cylindrical section 27 having a closed top provided with an angular outlet 28, while the bottom is open. Slidably fitted in the main section 27 is an intermediate cylindrical section 29 having an aperture in the upper end about which is formed a channel shaped annular rim structure 30. The bottom of the intermediate section 29 is also open to accommodate therein an interior or bottom section 31 slidably fitted in the intermediate section and likewise provided at the upper extremity with an annular channel shaped rim 32.

To the lower extremity of the section 31 is rigidly secured an annular flat foot plate 33 enclosing the lower end of the section and providing a diametrically enlarged flange portion. Slidably disposed within the section 31 is a cylindrical shaped plunger 35 normally depressed to a position at the bottom of the section by means of a coiled compression spring 36 disposed between the same and the upper rim structure 32. A collapsing tension spring 37 is also disposed to extend through the respective sections of the jack, the upper end thereof being attached to a projection depending from the top of the main section 27 while the lower end is connected with the transverse plate of the plunger 35.

When a fluid under pressure is forced into the upper end of the jack, the intermediate and bottom end sections 29 and 31, which are normally disposed in a retracted position telescopically within the main section, are slidably extended to limited extensible positions, as shown to advantage in Figure 4, so as to elevate one of the wheels of a vehicle. When the pressure supply is disconnected from the jack, the weight of the vehicle will tend to force the fluid from the jack so as to actuate the respective sections to a collapsed position. The final retracted movement of the sections is effected by means of the springs 36 and 37 which return the movable section to telescopic positions within the main section.

The respective jacks of the system are operated by fluid pressure, in the present example employing oil which may be selectively directed to each of the jacks through a distributing valve generally indicated at 40. The valve 40 embodies an elongated casing 41 having mounted therein a longitudinal tapered valve plug 42 rotatable through the medium of a rearwardly extending stem 43. In the forward portion of the plug 42 is formed a longitudinally extending bore 44 communicating, adjacent its lower end, with a radial bore 45 which may be rotated to register with any one of a plurality of radial ports formed through the forward portion of the casing 41. The inner or rear end of the longitudinal port 44 communicates with an annular channel 46, formed in the intermediate portion of the plug, through the medium of a radial bore 47.

A plurality of conduits 48 connect the distributing valve with each of the jacks 26, one end of each conduit 48 being connected with a radial port in the forward portion of the valve casing to communicate with the interior thereof while the opposed end is connected with the outlet 28 of the jack.

On the outer end of the valve stem 43 is fixed an actuating knob 50 having attached thereto a radially projecting pointer 51. The pointer 51 co-operates with an arcuate dial 52 bearing designating characters corresponding to and identifying each of the respective lifting jacks.

Formed through the rear portion of the valve casing 41 co-incident with the channel or groove 46 in the plug 42 are a pair of additional radial ports for the connection of a fluid delivery conduit 54 and a fluid return conduit 55. These conduits are so connected with the valve as to afford constant communication with the annular groove 46 in the valve plug.

Mounted in a suitable position on the vehicle chassis is a fluid reservoir 57 in the form of a cylindrical vertically elongated tank having a discharge opening adjacent the bottom and an intake opening adjacent the top. Within the reservoir 57 is disposed a vertically movable float member 58 having attached to the upper face a vertically projecting float rod 59. The rod 59 projects through an aperture in the top of the tank and the upper end thereof is connected with the pivoted joint of a pair of vertically swinging links 60 and 61. The link 61 is formed at its outer end with a slot slidably engaging a supporting pin attached to a standard 62.

The outer end of the link 60 is formed to provide a contact button 63 arranged to contact with a fixed contact button 64. The mechanism is arranged so that when the major portion of the fluid, that is a predetermined amount, is extracted from the tank, the float 58, by force of gravity, will assume a depressed position, causing corresponding movement of the links 60 and 61 and elevating the contact button 63 so as to break the normal contact thereof with the fixed button 64.

Communication is afforded between the distributing valve 40 and the tank 57 through the medium of the conduit 55, one end of which is connected to a rear bottom outlet of the distributing valve, while the opposed end is connected to the upper port of the tank. Interposed in the conduit 55, adjacent the distributing valve is a return control valve 63', preferably embodying therein a rotatable ball formed with a through bore and having projecting from diametrically opposed sides complementary sections of an actuating stem 64'.

One section of the stem 64' is connected with a fluid control lock 65, through the medium of which the valve may be adjusted to an open or a closed position. On the forward end of the opposed stem section is fixed a cam 66 arranged in contact with and disposed to selectively actuate the hinged blade 67 of a control switch. The blade 67 is normally urged to an outwardly swung circuit breaking position by means of a spring or the like and, when closed, closes the circuit between terminals 68 and 69.

Means for forcing the fluid under pressure to the respective jacks is supported adjacent the reservoir 57, in the present instance, such means embodying an electric motor 71 disposed vertically and having the shaft projecting upwardly therefrom. The shaft is arranged, through the instrumentality of a pinion, to drive a relatively large spur gear 72. Fixed on a common shaft with the gear 72 is a relatively small toothed pinion 73 meshing with and disposed to suitably actuate a drive gear 74.

Projecting upwardly from the gear 74 is an eccentrically disposed pin 75 engaging the slot of a crosshead frame 76. Projecting in opposite directions from opposed sides of the slotted crosshead frame 76 and arranged in alignment are a pair of piston rod sections 77 having their outer ends rigidly connected with pistons 78. The pistons 78 are mounted for reciprocating movement in a pair of complementary pump cylinders 80 each of which is formed, adjacent one end, with an inlet port 81 and an outlet port 82.

In each of the cylinder ports is mounted a check valve 83 embodying, in the present instance, ball valves normally urged to seated positions by means of springs. These valves are disposed so that during the suction stroke of the piston, the intake valve will be unseated, while the valve in the discharge port will be in closing position. During the pressure stroke, the action of these valves is reversed.

The complementary cylinders 80 are connected in parallel circuit relation by means of conduits 85 and 86, while the pistons function in reverse order in the respective cylinders so that a relatively constant flow of the fluid is forced into one of the jacks.

As diagrammatically illustrated in Figure 3, the contact 68 of the knife switch 67 is conncected with the vehicle battery through a conductor 88. The opposite contact 69 connects with one side of the float control link switch through the medium of a conductor 89. The fixed contact 64 of the float control switch is in turn connected with the motor 71 through the medium of a conductor 90. The battery and the opposite terminal of the motor may be grounded in the usual manner.

The operation of the apparatus is as follows: During such times as the jacks are in retracted, inoperative arrangement, the return control valve 63 and the control switch 67 are in open positions.

In order to extend any one of the jacks to an operative wheel elevating arrangement, the knob 50 carrying the pointer 51 is rotatably adjusted so that the pointer will be disposed in correspondence with the identifying characters of the predetermined jack upon the scale 52. A suitable lock control key 92 is then inserted in the lock 65 and suitably rotated in accordance with the lock construction which will be designed to rotate the stem 64' to a position wherein the ball valve in the valve 63' will assume a closing arrangement. Simultaneously with the closing of the valve 63' the cam 66 will be rotated in contact with the blade of the switch 67 so as to swing the blade to a switch closing position, thus, completing the electrical circuit and energizing the motor 71. By this means, the pump is placed in operation and the oil is extracted from the tank 57 through the initial conducting pipe 94, through the pump cylinders, and the conduit 54 into the distributing valve 40.

The preliminary adjustment of the distributing valve through rotation of the knob 50 has disposed the forward radial plug bore 45 in registration with one of the forward ports of the valve so that the oil will be pumped through one of the jack conduits 48 into the predetermined jack 26. When a sufficient quantity of oil has been extracted from the tank 57 to cause complete filling of the jack and entire extension thereof, the float 58 will act upon the link 60 so as to elevate the adjustable switch contact 63, breaking the electric circuit and interrupting the operation of the motor and force pump. At this stage of the operation, the automatic check valves 83, in the discharge outlets of the pump, will be closed so as to obviate return movement of the jack operating fluid and retain the jack in extended operative arrangement for any desirable period.

To restore the actuated jack to its retracted inoperative arrangement, and consequently lower the elevated wheel of the vehicle on to the ground, it is merely necessary to turn the lock key 92 to its original position so that the return valve 63' will be opened and the switch blade 67 released to disconnect the wiring circuit. The key may then be removed from the lock. By thus opening the return valve, the fluid, initially through the medium of the weight of the vehicle and subsequently by the springs 36 and 37, is discharged from the jack and the slidable jack sections returned to telescopic arrangement within the main fixed section 27. The oil is returned to the reservoir 57 for subsequent use in the operation of any one of the respective jacks.

It is to be understood that the form of my invention herein shown and described is to be taken as a preferred example of the same, and that various changes as to the shape, size, and arrangement of parts may be resorted to without departing from the spirit of the invention or the scope of the subjoined claim.

Having thus described my invention, I claim:

In lifting jack apparatus for motor vehicles, the combination with a plurality of extensible hydraulic pressure operated jacks, a liquid reservoir, a liquid pump, an electric motor to actuate said pump, an electric current source adapted to energize the motor and selectively controlled by a manual electric switch, and means whereby the reservoir may be placed in communication with any desired jack through the pump, of a float disposed in the reservoir and near the bottom thereof, a rod secured to said float and extending through the reservoir cover, and a pivoted electric switch actuated by said rod and limiting the upward movement of the float to the amount only necessary to close the switch, whereby said switch is closed when a small quantity of liquid is present into the reservoir and remains closed as long as said tank contains but a very small quantity of liquid, the pivoted electric switch controlling the action of the electric motor after the manual switch has been closed.

In witness whereof I have hereunto set my hand.

LOUIS LEBEL.